US012654297B2

(12) United States Patent
Wang et al.

(10) Patent No.: US 12,654,297 B2
(45) Date of Patent: Jun. 16, 2026

(54) CAP NAILER

(71) Applicant: BASSO INDUSTRY CORP., Taichung (TW)

(72) Inventors: Sheng-Man Wang, Taichung (TW); Liang-Chi Hung, Taichung (TW); Hung-Da Chen, Taichung (TW)

(73) Assignee: BASSO INDUSTRY CORP., Taichung (TW)

( * ) Notice: Subject to any disclaimer, the term of this patent is extended or adjusted under 35 U.S.C. 154(b) by 0 days.

(21) Appl. No.: 18/797,176

(22) Filed: Aug. 7, 2024

(65) Prior Publication Data

US 2025/0050484 A1 Feb. 13, 2025

(30) Foreign Application Priority Data

Aug. 11, 2023 (TW) ................................ 112130305

(51) Int. Cl.
*B25C 1/04* (2006.01)
*B25C 1/00* (2006.01)
*B25C 1/06* (2006.01)

(52) U.S. Cl.
CPC .............. *B25C 1/047* (2013.01); *B25C 1/005* (2013.01); *B25C 1/008* (2013.01); *B25C 1/06* (2013.01)

(58) Field of Classification Search
CPC .......... B25C 1/005; B25C 5/15; B25C 5/1693
See application file for complete search history.

(56) References Cited

U.S. PATENT DOCUMENTS 5,339,983 A * 8/1994 Caple .................... B65H 20/22 227/138
5,947,362 A * 9/1999 Omli .................... B25C 5/1693 227/120
6,302,310 B1 * 10/2001 Lamb .................... B25C 5/1693 227/119
6,478,209 B1 * 11/2002 Bruins .................. B25C 5/1693 227/16
6,543,666 B1 * 4/2003 Huang .................. B25C 5/1693 227/18
6,779,700 B2 * 8/2004 Bruins .................... B25C 1/006 227/18

(Continued)

FOREIGN PATENT DOCUMENTS

TW M245021 U 10/2004

*Primary Examiner* — Shelley M Self
*Assistant Examiner* — Katie L Gerth
(74) *Attorney, Agent, or Firm* — Burris Law, PLLC

(57) ABSTRACT

A cap nailer includes a machine body, a muzzle, a magazine, a cap feeding device, and a nail striking device. The muzzle is connected to the machine body and extends along a first axis. The magazine is connected to the muzzle, and extends in an extending direction of a second axis. The cap feeding device includes a cap cartridge that is juxtaposed with the magazine, and a cap rail that is connected to the cap cartridge and that has a third axis. The cap cartridge is adapted for accommodating a plurality of caps. The third axis and the first axis define an intersection point that is spaced apart from the muzzle. The cap rail is adapted for guiding the caps to move to the intersection point, and cooperates with the magazine to define a first included angle therebetween. The first included angle ranges from 15 degrees to 25 degrees.

7 Claims, 7 Drawing Sheets

(56) References Cited

U.S. PATENT DOCUMENTS

| | | | | |
|---|---|---|---|---|
| 6,968,945 | B2 * | 11/2005 | Bruins | B25C 1/006 206/820 |
| 9,555,529 | B2 * | 1/2017 | Ronconi | E04F 21/22 |
| 10,814,464 | B2 * | 10/2020 | Orchard | B65D 85/62 |
| 10,960,525 | B2 * | 3/2021 | Vandenberg | B25C 1/003 |
| 2001/0030138 | A1 * | 10/2001 | Bruins | B25C 1/006 206/343 |
| 2003/0015565 | A1 * | 1/2003 | Lee | B25C 5/1693 227/18 |
| 2003/0057248 | A1 * | 3/2003 | Bruins | B25C 1/003 227/18 |
| 2003/0213829 | A1 * | 11/2003 | Bruins | B25C 5/1693 227/99 |
| 2004/0197162 | A1 * | 10/2004 | Lamb | B25C 1/006 411/442 |
| 2008/0302847 | A1 * | 12/2008 | Liu | B25C 5/1693 227/16 |
| 2009/0114697 | A1 * | 5/2009 | Gross | B25C 1/001 227/120 |
| 2009/0308906 | A1 * | 12/2009 | Lamb | B25C 5/1693 227/119 |
| 2014/0305068 | A1 * | 10/2014 | Svanberg | E04D 3/362 206/340 |
| 2017/0100828 | A1 * | 4/2017 | Chien | B25C 1/06 |
| 2017/0106513 | A1 * | 4/2017 | Orchard | B25C 5/1693 |
| 2018/0223547 | A1 * | 8/2018 | Demuth | B25C 7/00 |
| 2019/0381644 | A1 * | 12/2019 | Vandenberg | B25C 1/003 |
| 2022/0161404 | A1 * | 5/2022 | Lim | B25C 1/003 |
| 2023/0137720 | A1 * | 5/2023 | Aizawa | B25C 1/047 227/129 |

* cited by examiner

CAP NAILER

CROSS-REFERENCE TO RELATED APPLICATION

This application claims priority to Taiwanese Invention Patent Application No. 112130305, filed on Aug. 11, 2023, the entire disclosure of which is incorporated by reference herein.

FIELD

The disclosure relates to a cap nailer, and more particularly to a cap nailer that is capable of firing a nail and nailing a cap to an object by the nail.

BACKGROUND

Referring to FIG. 1, a conventional nail gun 1 disclosed in Taiwanese Patent No. M245021 includes a main body 11, a muzzle 12 that is connected to the main body 11, a magazine 13 that is connected to the main body 11 and that is disposed vertically with respect to the muzzle 12, and a push mechanism 14. The magazine 13 is adapted for guiding a plurality of nails into the muzzle 12 such that the nails enter the muzzle 12 one by one. The push mechanism 14 is mounted to one side of the main body 11 that is different from the magazine 13, and has a feeding front end 141 that is at a front end of the muzzle 12, an accommodation groove 142 that is adapted for accommodating a plurality of shims (not shown), and a propulsion device 143 that is adapted for pushing the shims to the front end of the muzzle 12. When one of the nails in the muzzle 12 is fired, the one of the nails penetrates one of the shims that is at the front end of the muzzle 12. Thus, the shims may be automatically conveyed during each nail-striking operation.

To enhance balance of the conventional nail gun 1 when a user holds the conventional nail gun 1, the magazine 13 and the push mechanism 14 are arranged radially outwardly about the main body 11 such that the magazine 13 and the push mechanism 14 are configured to be A-shaped when viewed from a front-rear direction. However, the A-shaped arrangement causes a relatively large gap formed between one end of the magazine 13 that is distal from the muzzle 12 and one end of the push mechanism 14 that is distal from the muzzle 12. Therefore, a width of the conventional nail gun 1 is expanded, and it is not easy to carry or store the conventional nail gun 1.

It is important that, in a case where the main body 11 is located at a central position and that a weight of the magazine 13 is significantly smaller than that of the push mechanism 14, when the user holds the main body 11, a problem of weight imbalance in a left-right direction still exists.

SUMMARY

Therefore, an object of the disclosure is to provide a cap nailer that can alleviate at least one of the drawbacks of the prior art.

According to the disclosure, the cap nailer includes a machine body, a muzzle, a nail feeding device, a cap feeding device, and a nail striking device. The muzzle is connected to the machine body and extends along a first axis. The nail feeding device includes a magazine that is connected to the muzzle, and that extends in an extending direction of a second axis which is substantially perpendicular to the first axis. The nail feeding device is adapted for guiding a plurality of nails into the muzzle such that the nails enter the muzzle one by one in the extending direction of the second axis. The cap feeding device includes a cap cartridge that is juxtaposed with the magazine, and a cap rail that is connected to the cap cartridge and that has a third axis which intersects with the first axis. The cap cartridge is adapted for accommodating a plurality of caps. The third axis and the first axis define an intersection point that is spaced apart from the muzzle. The cap rail is adapted for guiding the caps to move one by one to the intersection point, and cooperates with the magazine to define a first included angle therebetween. The first included angle ranges from 15 degrees to 25 degrees. The nail striking device includes a nail striking member that extends from the machine body to the muzzle, and that is movable along the first axis. The nail striking member is adapted for striking any one of the nails that is in the muzzle such that the any one of the nails in the muzzle is urged to move toward one of the caps which is at the intersection point.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
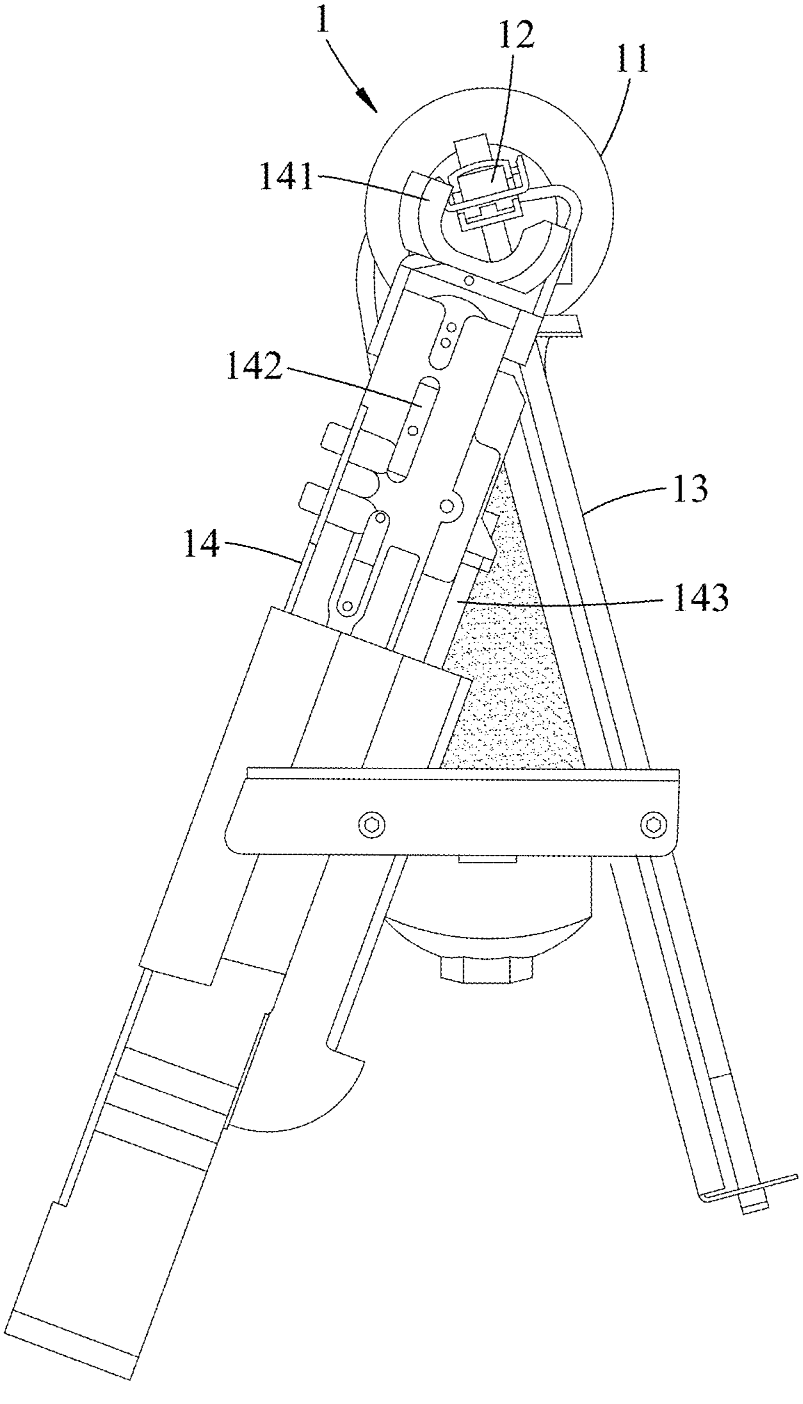
FIG. 1 PRIOR ART
FIG. 1 is a front view of a conventional nail gun disclosed in Taiwanese Patent No. M245021.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
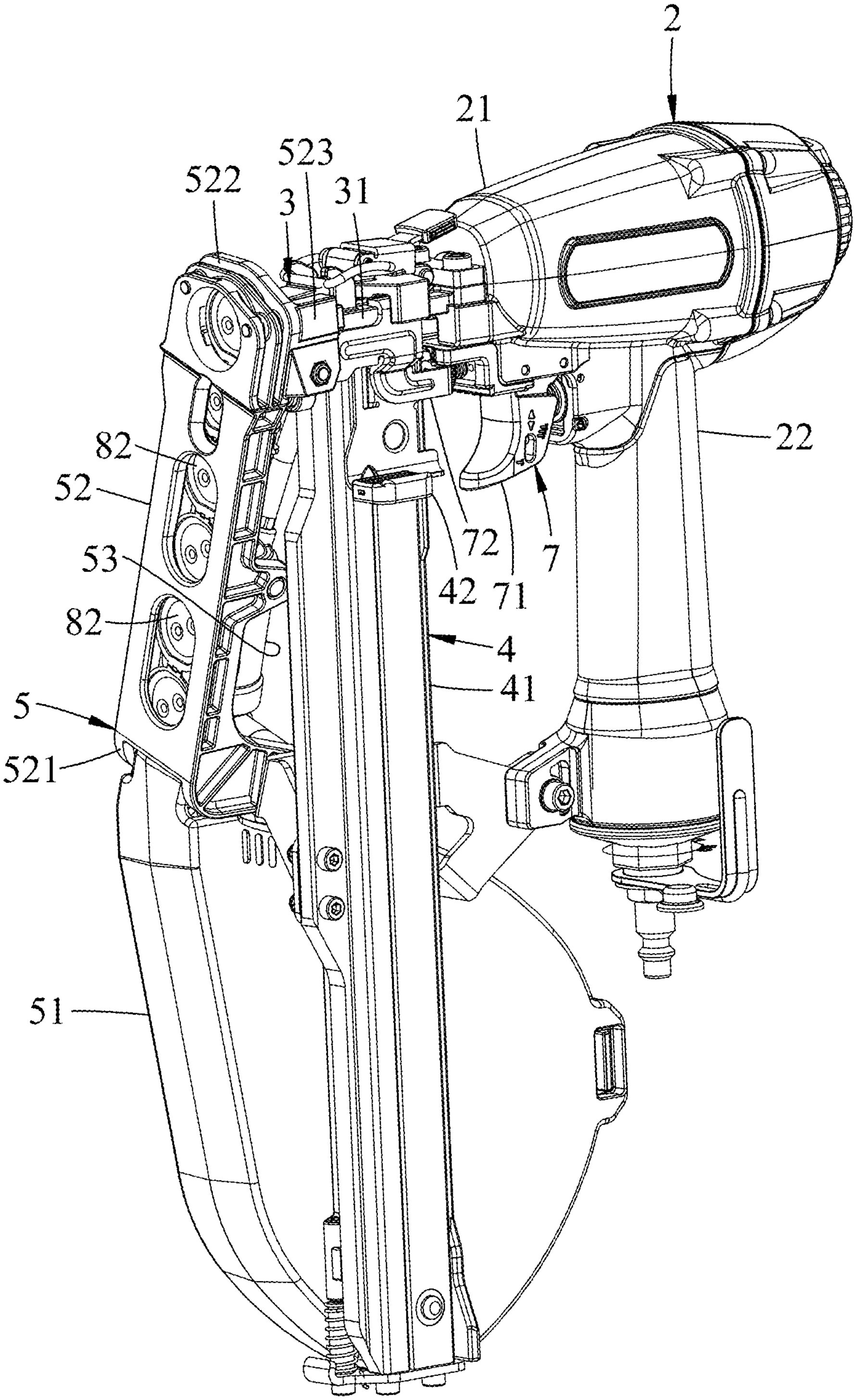
FIG. 2 is a perspective view of an embodiment of a cap nailer according to the present disclosure.
Figure 3:
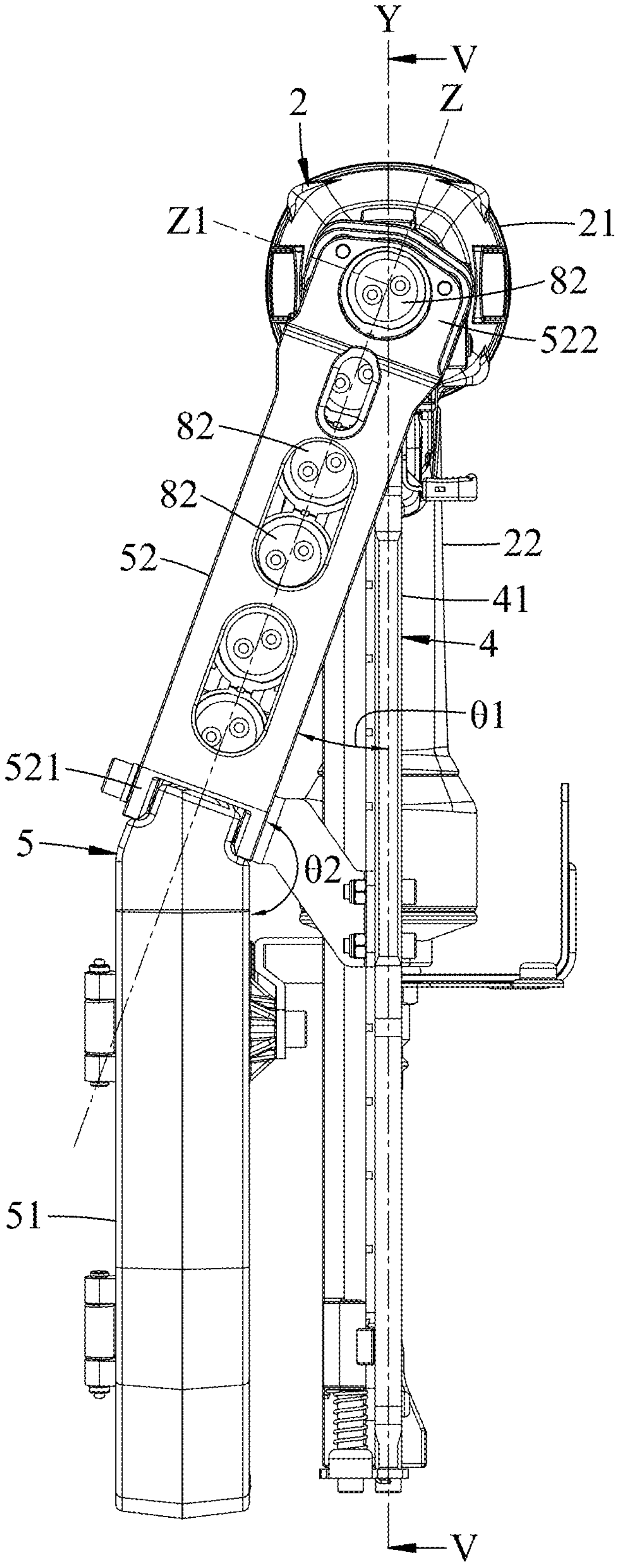
FIG. 3 is a front view of the embodiment.
Figure 4:
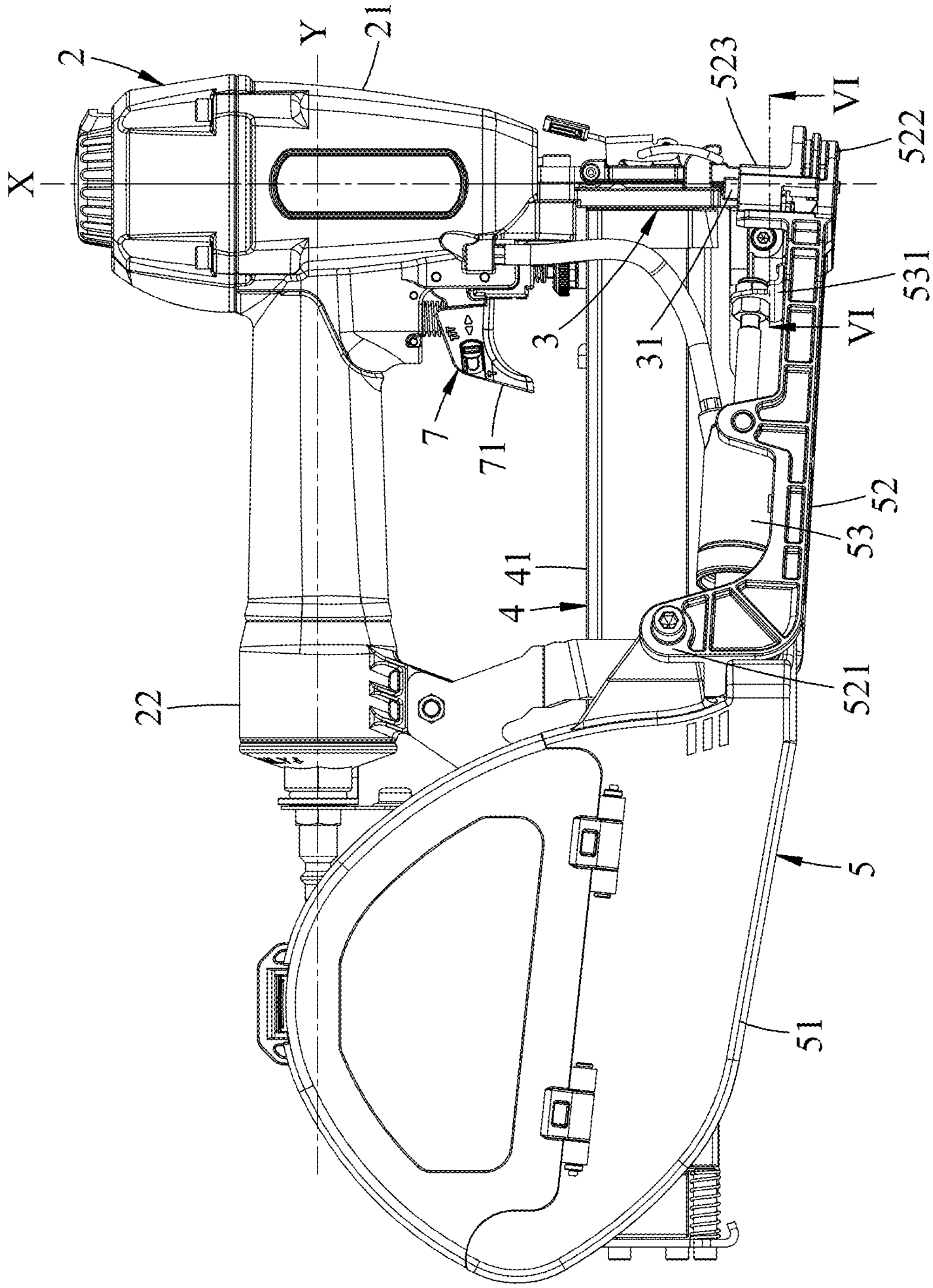
FIG. 4 is a side view of the embodiment.
Figure 5:
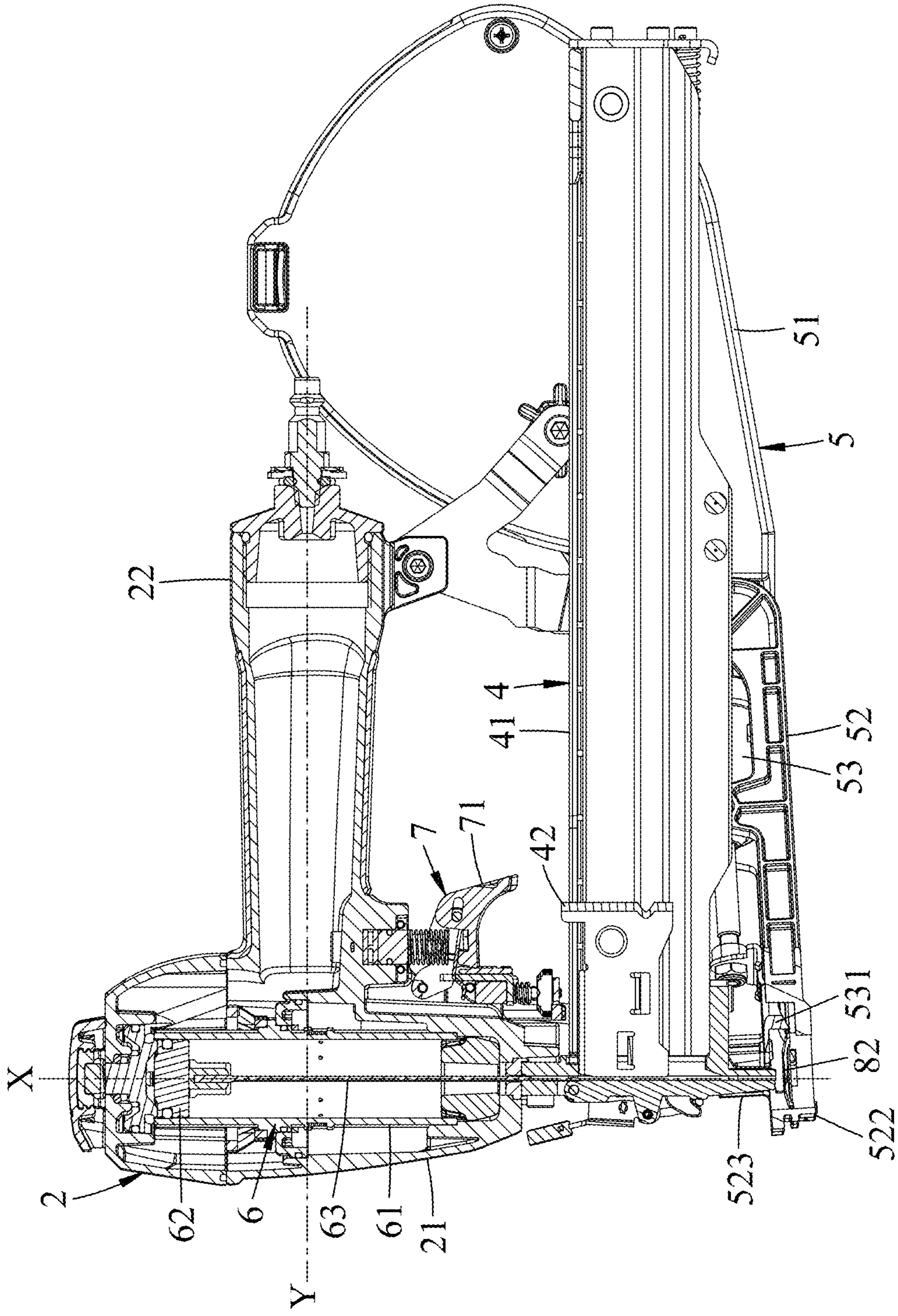
FIG. 5 is a sectional view taken along line V-V in FIG. 3.

Referring to FIGS. 2, 3, and 4, an embodiment of a cap nailer according to the present disclosure includes a machine body 2, a muzzle 3, a nail feeding device 4, a cap feeding device 5, a nail striking device 6 (see FIG. 5), and a control device 7.

The machine body 2 includes a main body portion 21 that extends along a first axis (X), and a grip portion 22 that is connected to the main body portion 21 and that is for a user to grip. The grip portion 22 extends along a second axis (Y) that is substantially perpendicular to the first axis (X).

Figure 6:
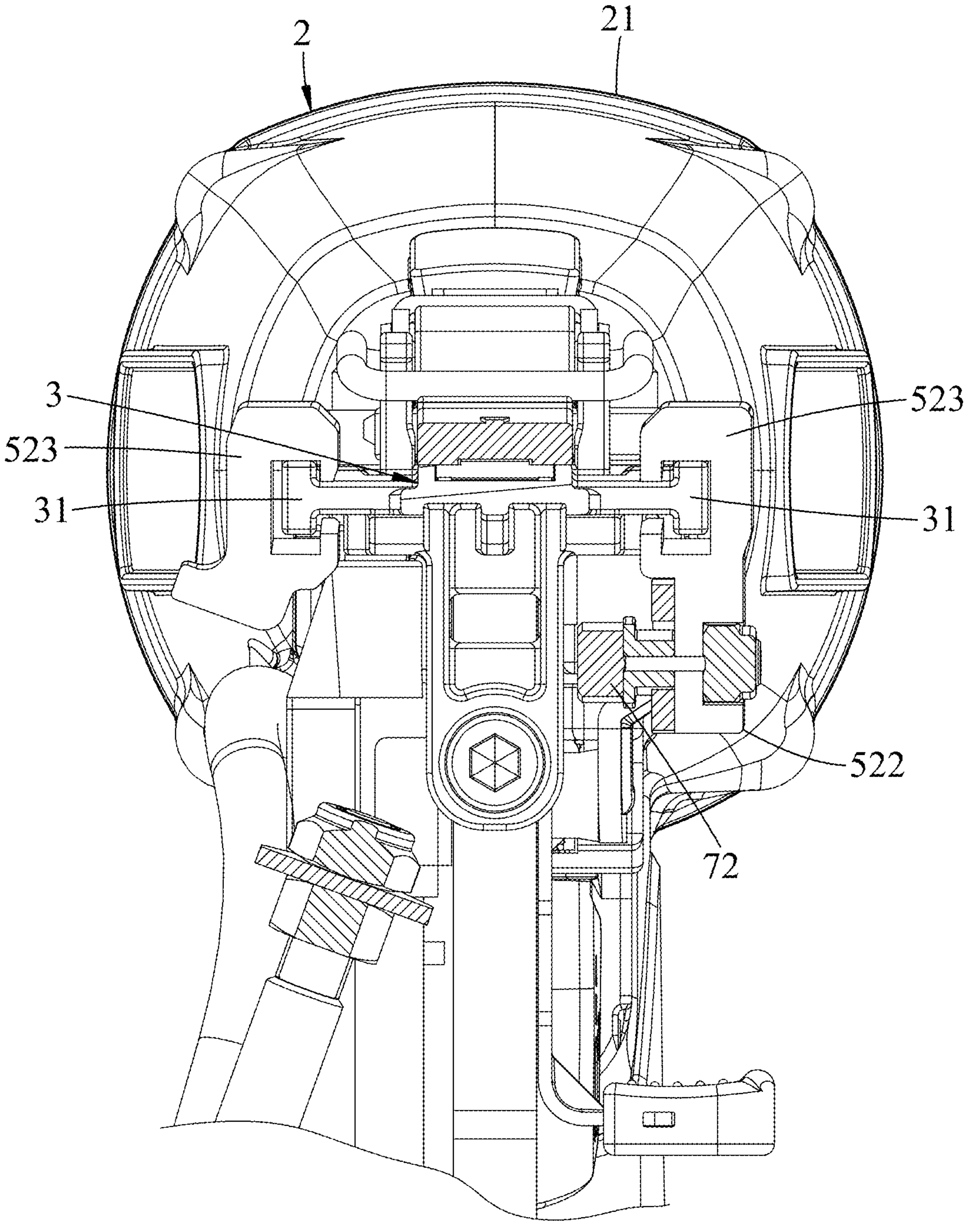
FIG. 6 is a fragmentary sectional view taken along line VI-VI in FIG. 4.

The muzzle 3 is connected to the main body portion 21 of the machine body 2, extends along the first axis (X), and includes two slide rails 31 (see FIG. 6) that are formed on two opposite sides thereof and that extend in an extending direction of the first axis (X).

Figure 7:
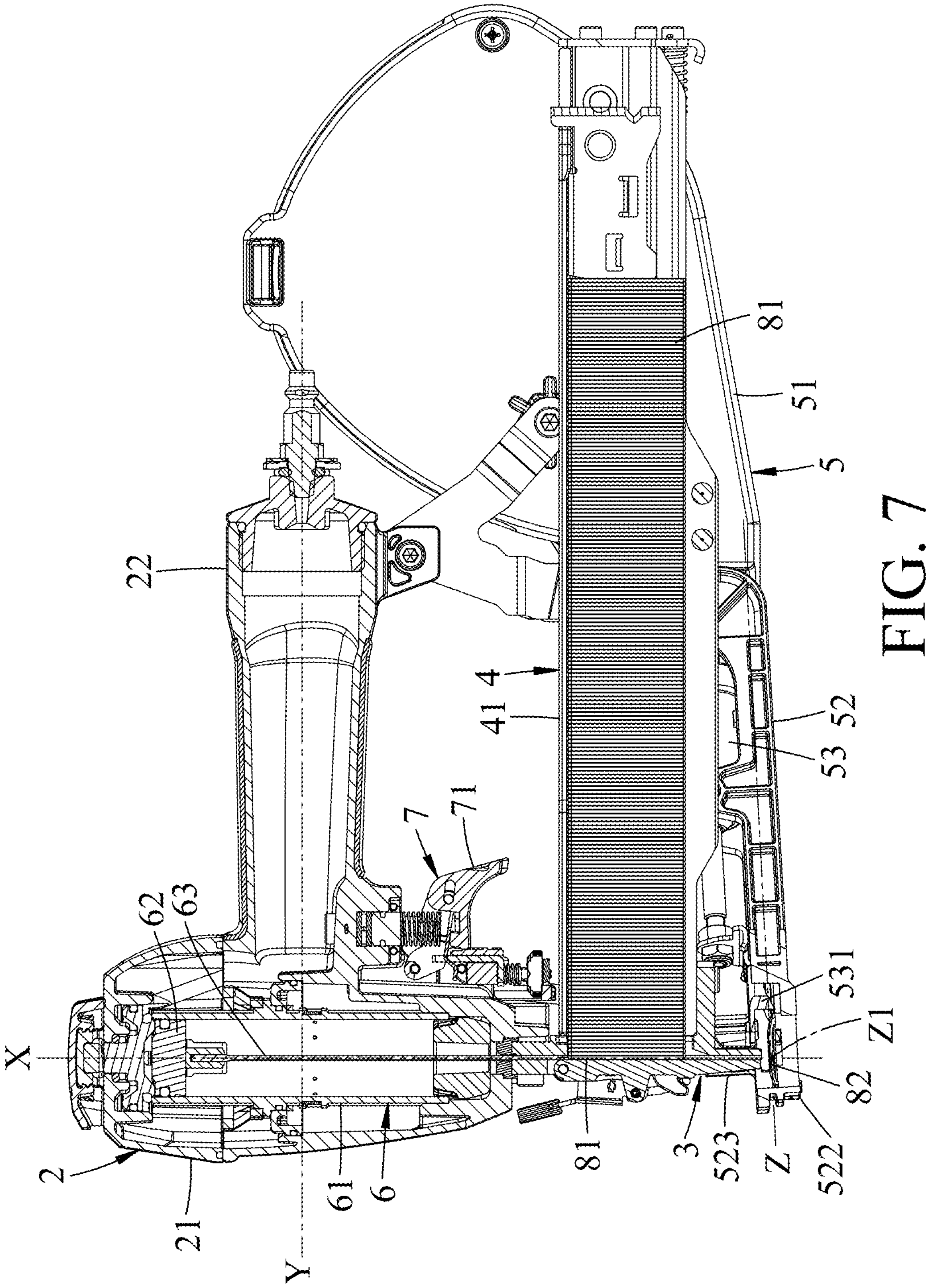
FIG. 7 is a view similar to FIG. 5, but illustrating that a magazine of the embodiment accommodates a plurality of nails, and that one of the nails is aligned with a cap.

The nail feeding device 4 is connected to the muzzle 3, and includes a magazine 41 that is connected to the main body portion 21 of the machine body 2 and the muzzle 3 and that is adapted for accommodating a plurality of nails 81 (as shown in FIG. 7), and a nail pushing member 42 that is movably connected to the magazine 41. The magazine 41 extends in an extending direction of the second axis (Y), and is parallel to the grip portion 22 of the machine body 2. In this embodiment, the magazine 41 is spaced apart from the grip portion 22 in the extending direction of the first axis (X). The nail pushing member 42 is movable in the extending direction of the second axis (Y), is drivable by a resilient force to move in the extending direction of the second axis (Y), and is adapted for pushing and guiding the nails 81 to move toward and into the muzzle 3 in the extending direction of the second axis (Y) such that the nails 81 enter the muzzle 3 one by one in the extending direction of the second axis (Y).

Referring to FIGS. 2, 3, 5, and 6, the cap feeding device 5 includes a cap cartridge 51, a cap rail 52, and a push unit 53.

The cap cartridge 51 is connected to the grip portion 22 of the machine body 2, is juxtaposed with the magazine 41, and is arranged parallel to the magazine 41 (i.e., the cap cartridge 51 extends in the extending direction of the second axis (Y)). The cap cartridge 51 is adapted for accommodating a plurality of caps 82. In this embodiment, the caps 82 are connected as a string, and the string of the caps 82 is wound. It should be noted that the cap cartridge 51 is not limited to be connected to the grip portion 22. In one embodiment, the cap cartridge 51 may be connected to the magazine 41.

The cap rail 52 is connected to the cap cartridge 51, extends toward the muzzle 3, and has a third axis (Z) (see FIG. 7) that intersects with the first axis (X). The cap rail 52 has a connecting portion 521 that is rotatably connected to the cap cartridge 51, and a guiding portion 522 that is opposite to the connecting portion 521 and that is adjacent to the muzzle 3. The guiding portion 522 of the cap rail 52 is movably sleeved on the muzzle 3, is movable in the extending direction of the first axis (X), and includes two slide blocks 523 that are formed on two sides thereof and that are respectively and slidably coupled to the slide rails 31. The third axis (Z) and the first axis (X) define an intersection point (Z1) (see FIG. 7) that is spaced apart from the muzzle 3. The cap rail 52 is adapted for guiding the caps 82 to move one by one from the cap cartridge 51 to the intersection point (Z1), and cooperates with the magazine 41 to define a first included angle (θ1) therebetween. The first included angle (θ1) ranges from 15 degrees to 25 degrees. In one embodiment, the first included angle (θ1) ranges from 19 degrees to 21 degrees. Furthermore, the connecting portion 521 of the cap rail 52 cooperates with the cap cartridge 51 to define a second included angle (θ2) therebetween. The second included angle (θ2) is smaller than 180 degrees. In this embodiment, the second included angle (θ2) ranges from 155 degrees to 165 degrees.

The push unit 53 is mounted to the cap rail 52, is adjacent to the muzzle 3, and includes a cap pushing member 531 that is drivable by pressure of a gas. The cap pushing member 531 is movable in an extending direction of the third axis (Z), and is adapted for pushing the caps 82 to move to the intersection point (Z1) one by one in the extending direction of the third axis (Z).

In this embodiment, the nail striking device 6 includes a cylinder 61 that is disposed in the main body portion 21, a piston 62 that movably extends into the cylinder 61 along the first axis (X) and that is drivable by the pressure of the gas, and a nail striking member 63 that is connected to the piston 62 and that extends from the machine body 2 to the muzzle 3. The nail striking member 63 is movable along the first axis (X), and is adapted for striking any one of the nails 81 that is in the muzzle 3 (as shown in FIG. 7) such that the any one of the nails 81 in the muzzle 3 is urged to move toward one of the caps 82 which is at the intersection point (Z1).

It should be noted that, the gas is high-pressure gas, part of the high-pressure gas drives the piston 62 during a nail-striking process, and another part of the high-pressure gas drives the cap pushing member 531 of the push unit 53 after the nail-striking process.

The control device 7 includes a trigger 71 that is operably mounted to the machine body 2, and a safety member 72 that is movably mounted between the muzzle 3 and the machine body 2 and that is movable in the extending direction of the first axis (X). The safety member 72 is connected to the guiding portion 522 of the cap rail 52. When the trigger 71 is operated and when the guiding portion 522 of the cap rail 52 urges the safety member 72 to move, the nail striking member 63 is triggered to strike the any one of the nails 81 that is in the muzzle 3.

It should be noted that the nail striking device 6 is not limited to drive movement of the piston 62 and the nail striking member 63 that is connected to the piston 62 via the pressure of the gas. In certain modifications of this embodiment, the nail striking member 63 may be driven by an electric power. If the nail striking device 6 drives the nail striking member 63 via the electric power, the nail striking device 6 may further include a flywheel (not shown) that is rotatably disposed on the machine body 2, an electric motor (not shown) that is mounted to the machine body 2 and that drives rotation of the flywheel, a swing arm unit (not shown) that is swingably connected to the machine body 2, and an impact member (not shown) that is movably disposed on the swing arm unit, that is movable along the first axis (X), and that is connected to the nail striking member 63. When the impact member is moved by the swing arm unit to contact the flywheel, the impact member is thrown by the rotation of the flywheel to urge the nail striking member 63 to strike the any one of the nails 81 that is in the muzzle 3. Because the nail striking device 6 and the control device 7 are known structures and relevant descriptions thereof can be referred to Taiwanese Patent Publication No. TW201827173A, and because those skilled in the art may extrapolate details from the above description, detailed descriptions of the nail striking device 6 and the control device 7 are omitted.

Referring to FIGS. 3, 4, 6, and 7, when the cap nailer is in an initial state, the muzzle 3 contains one of the nails 81, and one of the caps 82 is positioned at the intersection point (Z1).

When the user uses the cap nailer, the guiding portion 522 of the cap rail 52 is pressed against an object (not shown) to urge the safety member 72 to move and then the user pulls the trigger 71, or alternatively, the user pulls the trigger 71 and then the guiding portion 522 of the cap rail 52 is pressed against the object to urge the safety member 72 to move. At this time, the safety member 72 is moved toward the trigger 71 in the extending direction of the first axis (X), and the guiding portion 522 of the cap rail 52 is moved toward the muzzle 3 such that the intersection point (Z1) gets closer to a front end of the muzzle 3. Furthermore, the trigger 71 urges the gas to enter the cylinder 61 so that the piston 62 is urged by the pressure of the gas to urge the nail striking member 63 to strike the one of the nails 81 that is contained in the muzzle 3 along the first axis (X). The nail-striking process is thus completed.

During a process of the one of the nails 81 moving along the first axis (X) and exiting the muzzle 3, the one of the nails 81 penetrates the one of the caps 82 that is located at the intersection point (Z1) so that the one of the caps 82 is nailed to the object by the one of the nails 81 and that the one of the caps 82 presses against the object.

Through the above description, advantages of the cap nailer are summarized as follows:

1. By virtue of the cap feeding device 5 being independent from the nail feeding device 4, and by virtue of operation of the cap feeding device 5 being not involved with that of the nail feeding device 4, structure of the cap feeding device 5 is simplified, and the cap feeding device 5 does not incur a high manufacturing cost, and is easy to be assembled and disassembled for maintenance.

2. By virtue of the cap cartridge 51 being juxtaposed with the magazine 41 and being arranged parallel to the magazine 41, by virtue of the grip portion 22 of the machine body 2 being spaced apart from and parallel to the magazine 41, by virtue of the cap rail 52 cooperating with the magazine 41 to define the first angle (θ1) that ranges from 15 degrees to 25 degrees, and by virtue of the connecting portion 521 of the cap rail 52 cooperating with the cap cartridge 51 to define the second included angle (θ2) that is smaller than 180 degrees, the magazine 41 and the machine body 2 each of which is generally lighter than the cap feeding device 5 are arranged on a same imaginary plane that is defined by the first axis (X) and the second axis (Y) while the heavier cap feeding device 5 is juxtaposed with the machine body 2 and the magazine 41 (i.e., the cap feeding device 5 is substantially not arranged on the imaginary plane). Therefore, balance of the cap nailer when the user holds the cap nailer is enhanced, and a width of an overall size of the cap nailer is reduced without adversely affecting smooth movement of each of the caps 82, thereby making the cap nailer easy to carry or to store.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A cap nailer comprising:

a machine body;

a muzzle connected to the machine body and extending along a first axis;

a nail feeding device including a magazine that is connected to the muzzle and that extends in an extending direction of a second axis which is substantially perpendicular to the first axis, the nail feeding device being adapted for guiding a plurality of nails into the muzzle such that the nails enter the muzzle one by one in the extending direction of the second axis;

a cap feeding device including a cap cartridge that is juxtaposed with the magazine, and a cap rail that is connected to the cap cartridge and that has a third axis which intersects with the first axis, the cap cartridge being adapted for accommodating a plurality of caps, the third axis and the first axis defining an intersection point that is spaced apart from the muzzle, the cap rail being adapted for guiding the caps to move one by one to the intersection point, and cooperating with the magazine to define a first included angle therebetween, the first included angle ranging from 15 degrees to 25 degrees; and a nail striking device including a nail striking member that extends from the machine body to the muzzle and that is movable along the first axis, the nail striking member being adapted for striking any one of the nails that is in the muzzle such that the any one of the nails in the muzzle is urged to move toward one of the caps which is at the intersection point;

wherein the cap cartridge is arranged parallel to the magazine;

wherein, when viewed in a first observation direction that is perpendicular to the first axis and the second axis, an extending direction of the muzzle is substantially perpendicular to an extending direction of the magazine; and wherein, when viewed in an extending direction of the first axis, an extending direction of the cap cartridge is non-parallel to an extending direction of the cap rail, and is parallel to the extending direction of the magazine.

2. The cap nailer as claimed in claim 1, wherein the cap rail has a connecting portion that is rotatably connected to the cap cartridge, and a guiding portion that is opposite to the connecting portion and that is adjacent to the muzzle, the connecting portion of the cap rail cooperating with the cap cartridge to define a second included angle therebetween, the second included angle being smaller than 180 degrees.

3. The cap nailer as claimed in claim 2, wherein the guiding portion of the cap rail is movably sleeved on the muzzle and is movable in the extending direction of the first axis.

4. The cap nailer as claimed in claim 3, further comprising a control device, the control device including a trigger that is operably mounted to the machine body, and a safety member that is movably mounted between the muzzle and the machine body and that is movable in the extending direction of the first axis, the safety member being connected to the guiding portion of the cap rail, the nail striking member being triggered to strike the any one of the nails that is in the muzzle when the trigger is operated and when the guiding portion of the cap rail urges the safety member to move.

5. The cap nailer as claimed in claim 3, wherein the muzzle includes two slide rails that are formed on two opposite sides thereof and that extend in the extending direction of the first axis, the guiding portion of the cap rail including two slide blocks that are formed on two sides thereof and that are respectively and slidably coupled to the slide rails.

6. The cap nailer as claimed in claim 1, wherein the nail feeding device further includes a nail pushing member that is movably connected to the magazine, that is movable in the extending direction of the second axis, and that is drivable by a resilient force, the nail pushing member being adapted for pushing the nails to move toward the muzzle in the extending direction of the second axis.

7. The cap nailer as claimed in claim 1, wherein the machine body includes a main body portion that extends along the first axis, and a grip portion that is connected to the main body portion and that extends along the second axis, the magazine being spaced apart from the grip portion of the machine body in the extending direction of the first axis, and being parallel to the grip portion.

* * * * *